United States Patent [19]
Taniguchi et al.

[11] Patent Number: 5,350,917
[45] Date of Patent: Sep. 27, 1994

[54] OPTO-MAGNETIC RECORDING POLARIZATION OPTICAL APPARATUS INCLUDING A LASER DIODE AND A LIGHT ABSORBING FILM

[75] Inventors: Tadashi Taniguchi; Chiaki Kojima, both of Kanagawa, Japan

[73] Assignee: Sony Corporation, Tokyo, Japan

[21] Appl. No.: 996,149

[22] Filed: Dec. 23, 1992

[30] Foreign Application Priority Data

Dec. 27, 1991 [JP] Japan .................................. 3-359406
Jan. 21, 1992 [JP] Japan .................................. 4-030044
Jan. 24, 1992 [JP] Japan .................................. 4-034205

[51] Int. Cl.$^5$ .......................................... H01J 3/14
[52] U.S. Cl. .................................. 250/216; 257/435
[58] Field of Search ................. 250/216, 208.1, 208.2; 257/432, 434, 435, 436; 369/44.13, 44.23, 44.42, 44.41, 112

[56] References Cited

U.S. PATENT DOCUMENTS

| | | | |
|---|---|---|---|
| 4,262,198 | 4/1981 | Gupta et al. | 250/216 |
| 4,695,719 | 9/1987 | Wilwerding | 250/216 |
| 4,772,784 | 9/1988 | Yoshitoshi et al. | 250/216 |

FOREIGN PATENT DOCUMENTS 0278406  8/1988  European Pat. Off. .
0439876  7/1991  European Pat. Off. .

OTHER PUBLICATIONS

Patent Abstracts of Japan Publication No. JP-4-1-77643.
Patent Abstract of Japan JP 56107247.

*Primary Examiner*—David C. Nelms
*Assistant Examiner*—Que T. Le
*Attorney, Agent, or Firm*—Hill, Steadman & Simpson

[57] ABSTRACT

In an optical apparatus according to the present invention, a light-absorbing film is formed between a light-receiving element and an optical semitransparent film formed on the light-receiving element to cause the light-receiving element to partially receive incident light. In addition, in an optomagnetic recording polarization optical apparatus according to the present invention, a prism for guiding a reflected light component from an optomagnetic recording medium to a light-receiving element and the light-receiving element are arranged on the same substrate.

4 Claims, 8 Drawing Sheets

OPTO-MAGNETIC RECORDING POLARIZATION OPTICAL APPARATUS INCLUDING A LASER DIODE AND A LIGHT ABSORBING FILM

BACKGROUND OF THE INVENTION

1. Field of the Invention

The present invention relates to a pickup structure for optically reading recorded data from a recording medium.

2. Description of the Prior Art

In an optical disk player or the like, as shown in FIG. 1A, a light-emitting-receiving composite element called a laser coupler 11 is used in an optical pickup. In the laser coupler 11, photodiodes 13 and 14 are formed on an Si substrate 12, and a prism 15 is fixed on the photodiodes 13 and 14 by an adhesive.

A submount 16 serving as another Si substrate is fixed on the Si substrate 12 by soldering or the like. A photodiode 17 is formed on the submount 16, and a laser diode 21 is fixed on the submount 16 by soldering or the like.

In order to reproduce data recorded on a optical disk 22 using the laser coupler 11, part of the light 23 emitted from the laser diode 21 is reflected on a surface 15a of the prism 15, transmitted through an objective lens 24, and incident on the optical disk 22.

The part of the light 23 which is reflected by the optical disk 22, is transmitted through the objective lens 24, and incident on the surface 15a of the prism 15 and is refracted and enters into the prism 15. The first half of the light 23 which enters into the prism 15 is incident on the photodiode 13, and the second half is reflected by the photodiode 13 and is totally reflected by a surface 15b of the prism 15, and is incident on the photodiode 14.

The photodiode 14, as shown in FIG. 1B, is divided into three parts A, B and C, and the photodiode 13, as shown in FIG. 1C, is divided into three parts D, E and F. An output obtained from these photodiodes 13 and 14 and expressed by:

(A+C+E)−(B+D+F)

is used as a focus error signal.

Therefore, as described above, 50% of the light 23 which enters into the prism 15 through the surface 15a must be incident on the photodiode 13, and the remaining 50% must be reflected by the photodiode 13.

For this reason, in the conventional pickup used in an unpolarization optical system recording scheme such as an optical disk, as shown in FIG. 3, an optical semitransparent film 25 (half mirror) having a reflectance of 50% is deposited on a portion of the prism 15 opposite to the photodiode 13.

Note that an SiO$_2$ film 26 serving as a protection film is formed on the surface of the Si substrate 12, and an adhesive layer 27 is interposed between the SiO$_2$ film 26 and the optical semitransparent film 25 on the photodiode 13 as shown in FIG. 4. Furthermore, the photodiode 17 receives the light 23 emitted from the rear surface of the laser diode 21 to perform automatic power control.

The refractive indices of the Si substrate 12, the SiO$_2$ film 26 and the adhesive layer 27 are about 3.5, about 1.5 and about 1.45, respectively, with respect to light having a wavelength of 780 nm. For this reason, about 16% of the incident light is reflected by the interface between the Si substrate 12 and the SiO$_2$ film 26 which have a large refractive index difference, and as shown in FIG. 4, the light 23 is reflected in a multiple form between the interface and the optical semitransparent film 25 which causes multiple interference to occur.

When the light 23 serving as convergent light having incident angles changed according to incident positions is incident on the portion where the multiple interference occurs, bright and dark portions are formed according to the incident angles, and fringes shown in FIG. 5 are formed. Since the fringes are functions of the incident angles and wavelengths, when the wavelength of the laser diode 21 is varied by a change in temperature, the fringes move.

The movement of the fringes adversely affect the variable temperature characteristics of the laser coupler 11, and an optical disk player or the like using the laser coupler 11 is defective under the standards of currently available optical disk players and the like.

As shown in the prior art FIG. 6, the optical semitransparent film 25 is not formed, and an SiN film 31 having a refractive index of about 2.0 is formed on a portion of the SiO$_2$ film 26 on the photodiode 13. In this manner, a structure for obtaining the function of an optical semitransparent film with four layers consisting of the adhesive layer 27, the SiN film 31, the SiO$_2$ film 26 and the Si substrate 12 is also considered.

In this structure of FIG. 6, however, the maximum reflectance is about 40%, and a ratio of the amount of light incident on the photodiode 13 to that on the photodiode 14 cannot be set to be 1:1. This ratio of the light amounts may be electrically corrected. However, in this case, noise in the photodiodes 13 and 14 cannot be differentially reduced. That is, an optical optimal point and a signal optimal point do not coincide with each other, thereby degrading the playability of an optical disk player.

In addition, in order to obtain the structure in FIG. 6, each of the products of the thicknesses and refracting indices of the SiN film 31 and the SiO$_2$ film 26 must be set to be λ/4 of the light 23. However, the SiN film 31 and the SiO$_2$ film 26 each have a high-precision film thickness and cannot be easily formed in mass production.

Therefore, the above problem cannot be easily solved by the prior art. Although an unpolarization optical system recording scheme is applied to a laser coupler used for an optical disk in which the above laser diode, a microprism and the like are integrally arranged, this recording scheme can be used for only reading data.

As a recording medium capable of repetitively recording and erasing data, an optomagnetic disk serving as a polarization optical system recording scheme is known.

A basic optical system of the above optomagnetic disk is shown in FIG. 2. Multi-mode laser light emitted from a semiconductor laser 46 passes through a collimating lens 45 and a beam shaping prism 44 and is incident on a special beam splitter 43. In the special beam splitter 43, ① the linearly polarized component of the laser light is highly purified, and ② weak signal light is separated from the laser light.

A light-receiving optical system splits light reflected by the special beam splitter 43 into light components to a data signal detecting system and a focus tracking control signal detecting system, and the light component incident on the data signal detecting system is guided to a differential optical system.

In addition, the light component incident on the focus tracking control signal detecting system is guided to a focus error signal detecting optical system and to a tracking error signal detecting optical system.

As a conventional pickup for recording and reading data on/from the above optomagnetic disk, a pickup obtained by assembling parts such as a polarization beam splitter and fixing them with an adhesive or the like is known.

The conventional pickup obtained by assembling these parts does not have a small size and thin thickness.

A pickup used in a polarization optical system recording scheme must have a structure in which a laser coupler obtained by integrating a laser diode, a microprism and the like is formed to equally split light which enters into the prism into light components to two or more photodiodes.

OBJECTS AND SUMMARY OF THE INVENTION

As the first object of the present invention, in a pickup using an unpolarization optical system recording scheme, in order to solve a problem in which about 16% of incident light is reflected by an interface between an Si substrate and an SiO2 film to cause multiple interference to occur, a light-absorbing film is formed between a light-receiving element and an optical semitransparent film.

As the second object of the present invention, a laser coupler obtained by integrating a laser diode, a microprism and the like is formed as a pickup using a polarization optical system recording scheme to solve problems in realizing a compact, small pickup using conventional parts.

BRIEF DESCRIPTION OF THE DRAWINGS

The present invention will be understood more fully from the detailed description given herebelow and from the accompanying drawings of the preferred embodiments of the invention, however, the drawings are not intended to imply limitation of the invention to a specific embodiment, but are for explanation and understanding only.

DETAILED DESCRIPTION OF THE PREFERRED EMBODIMENTS

Figure 1A:
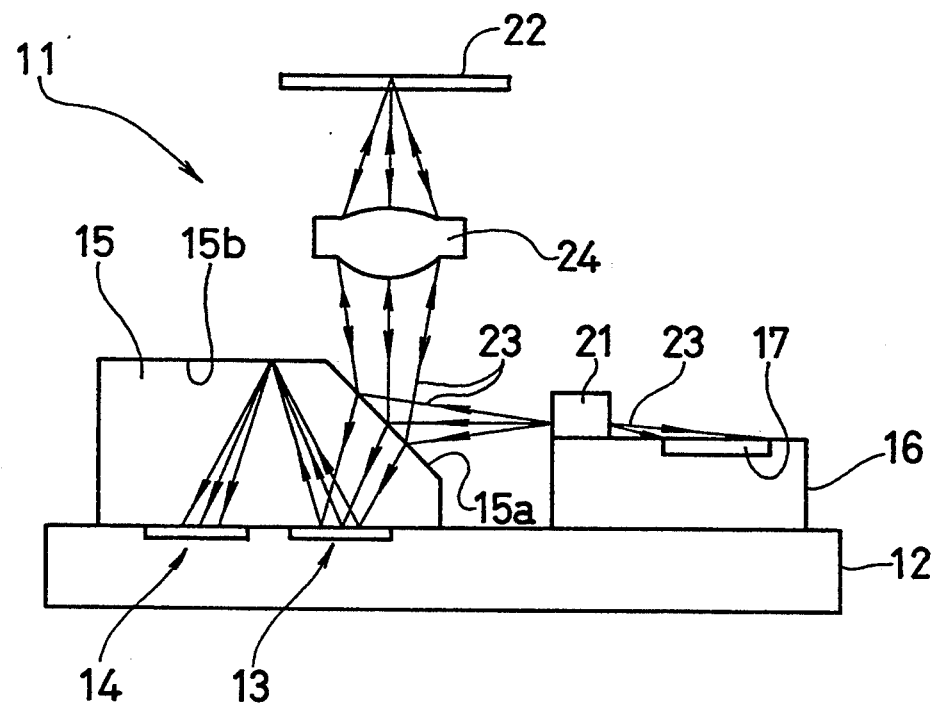
FIG. 1A is a side view showing a conventional structure.
Figure 1B:
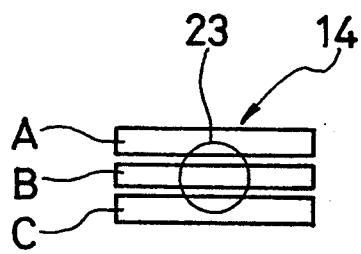
FIGS. 1B and 1C are plan views showing a photodiode of the conventional structure in FIG. 1A.
Figure 1C:
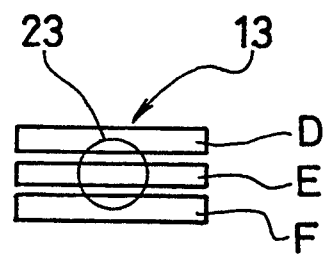
Figure 2:
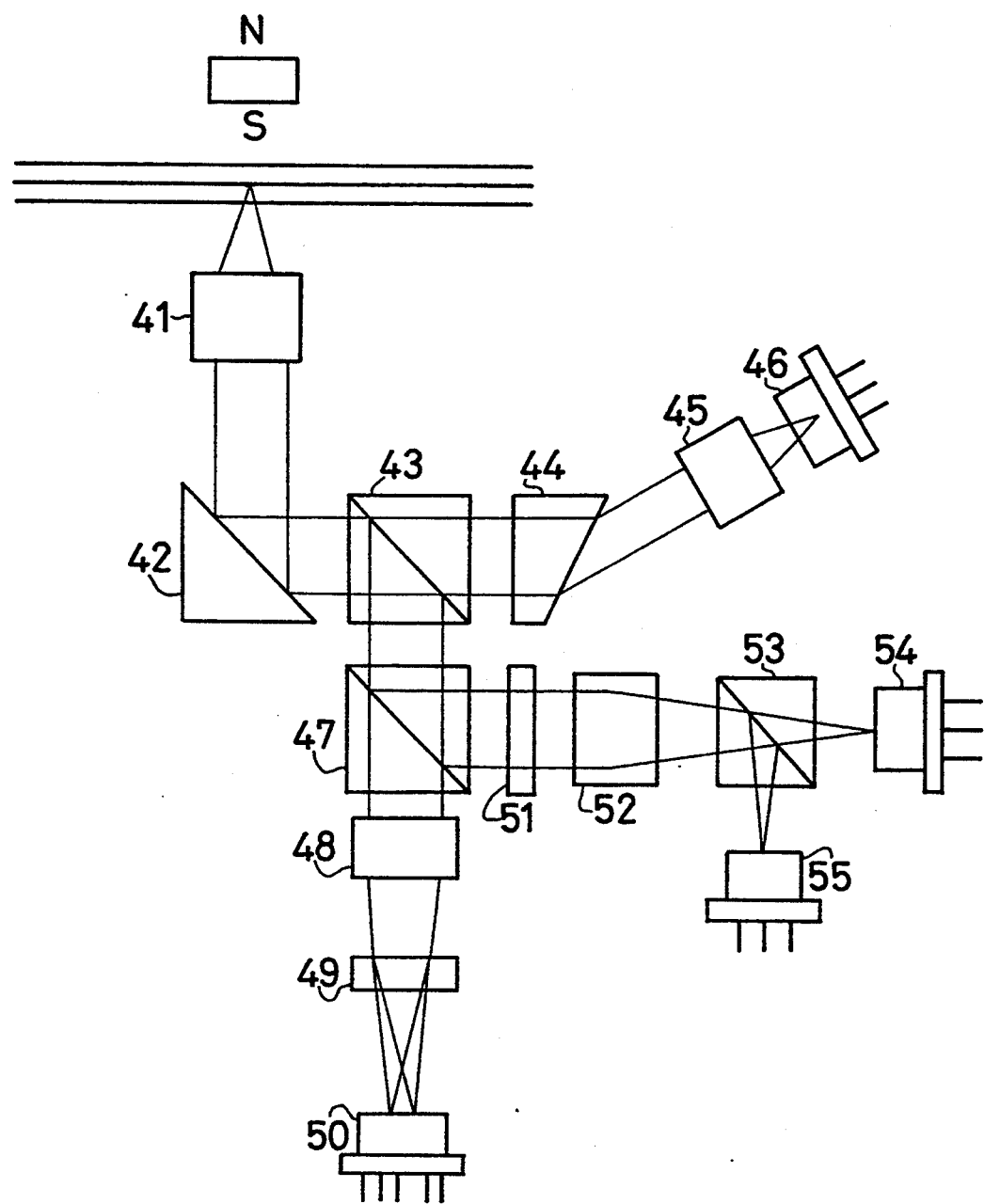
FIG. 2 is a view showing the structure of a conventional pickup of an optomagnetic disk which is not integrated with a laser coupler.
Figure 3:
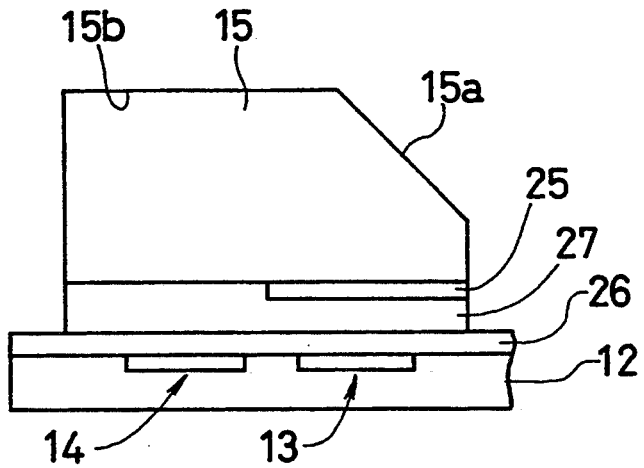
FIG. 3 is a side view showing another prior art.
Figure 4:
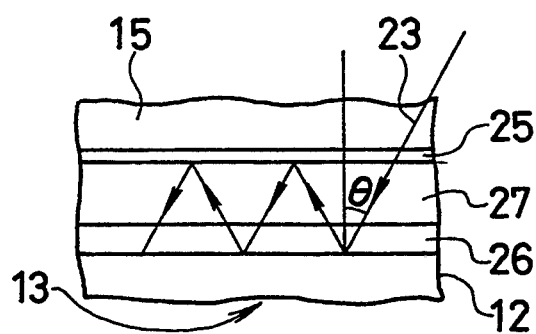
FIG. 4 is an enlarged side view showing a main part of the prior art in FIG. 3.
Figure 7A:
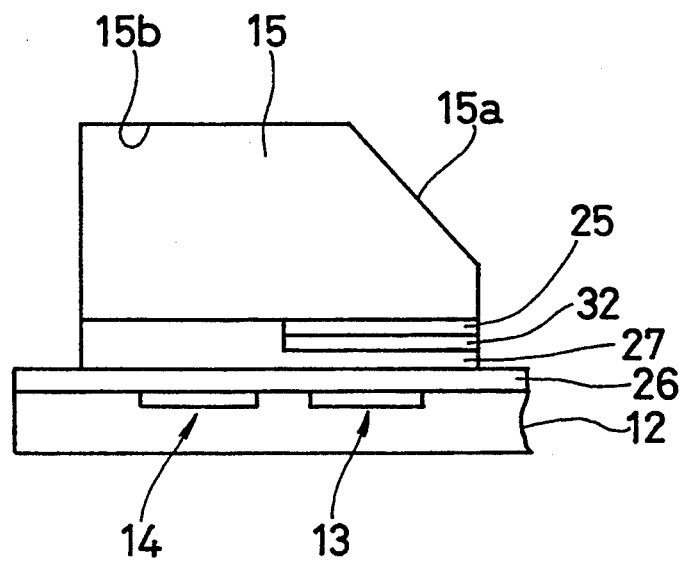
FIG. 7A is a side view showing the first embodiment of the present invention.

Embodiments of the present invention will be described below with reference to an unpolarization optical system and a polarization optical system. The first embodiment has the same arrangement as that of the prior art shown in FIG. 3 except that a light-absorbing film 32 is added to an adhesive layer 27 side of an optical semitransparent film 25 as shown in FIG. 7A. Note that the adhesive layer 27 has a thickness of about 10 $\mu$m.

Figure 7B:
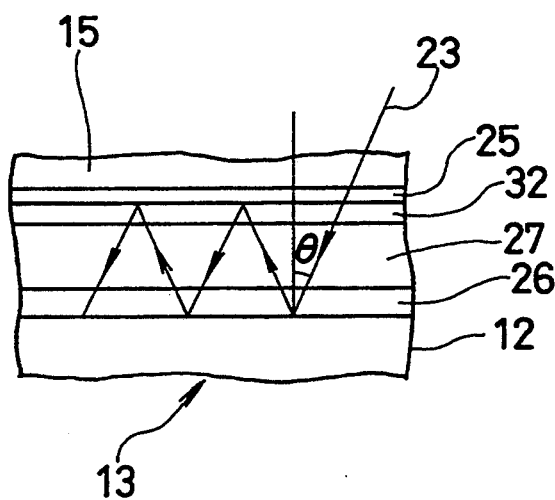
FIG. 7B is an enlarged side view showing a main part of the first embodiment.

According to the above first embodiment, when the transmittance of the light-absorbing film 32 is represented by T ($<$1), as is apparent from FIG. 7B, the amount of light 23 transmitted through the optical semitransparent film 25 and the light-absorbing film 32 and directly incident on a photodiode 13 is decreased to T times that obtained when the light-absorbing film 32 is not used.

Figure 5:
FIG. 5 is a plan view showing fringes.
Figure 6:
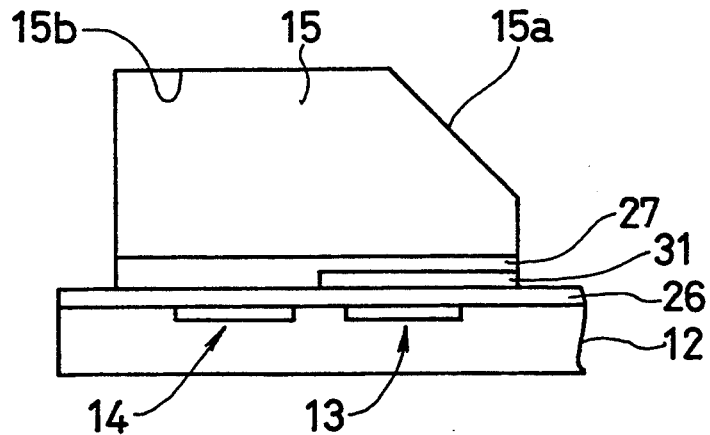
FIG. 6 is a side view showing still another prior art.

However, the amount of the light 23 reflected in a multiple manner between the optical semitransparent film 25 and the interface between an Si substrate 12 and an SiO2 film 26 is abruptly decreased to $T^3$ and $T^5$ times ... For this reason, multiple interference is suppressed, and fringes shown in FIG. 5 are not formed.

At this time, when the reflectance of the optical semitransparent film 25 is represented by R, the amount of the light 23 incident on the photodiode 13 is proportional to $(1-R) \cdot T$, and the amount of the light 23 incident on a photodiode 14 is proportional to R. Therefore, when R and T are set to satisfy the following equation:

$$T = R/(1-R),$$

a ratio of the amount of light incident on the photodiode 13 to that on the photodiode 14 can be set to be 1:1.

When the reflectance R and the transmittance T are set to be variable values such that the ratio of the amount of light incident on the photodiodes 13 to that on the photodiode 14 is set to be 1:1, a ratio of the intensity of the light 23 incident on the interface between the Si substrate 12 and the SiO2 film 26 to the intensity of the light 23 incident on the optical semitransparent film 25 can be actually calculated.

When the amplitude of the light 23 incident on the optical semitransparent film 25 is represented by $I_0$; the amplitude reflectance of the optical semitransparent film 25, $r_h$; the amplitude transmittance of the optical semitransparent film 25, $t_h$; the amplitude transmittance of the light-absorbing film 32, $t_a$; and the amplitude reflectance of the interface between the Si substrate 12 and the SiO2 film 26, $r_s$, the amplitude of the light 23 directly incident on the interface is given by:

$$I_0 \cdot t_h \cdot t_a$$

In addition, the amplitude of the light 23 reflected once by the interface and the optical semitransparent film 25 and incident on the interface again is given by:

$$I_0 \cdot t_h \cdot t_a \cdot r_s \cdot t_a \cdot r_h \cdot t_a \cdot \exp(-i\delta) \qquad 5$$

where $\delta$ is a phase difference. When the thickness of an interference film, i.e., three layers consisting of the light-absorbing film 32, the adhesive layer 27 and the SiO$_2$ film 26 is represented by d, the refractive index of the three layers is represented by n, the wavelength of the light 23 is represented by $\lambda$, and the incident angle of the light 23 is represented by $\theta$ (FIG. 7B), the following equation can be obtained:

$$\delta = (2\pi/\lambda) \cdot 2nd \cdot \cos\theta$$

Therefore, the phase difference $\delta$ is changed according to the incident angle $\theta$. In addition, since the phase difference $\delta$ depends on the wavelength $\lambda$, the phase difference $\delta$ is also changed according to the temperature characteristic of a laser diode 21. For this reason, fringes move as described above.

Multiple interference is the sum of the light components described above, and the amplitude of the light 23 incident on the interface between the Si substrate 12 and the SiO$_2$ film 26 is given by:

$$I = (I_0 \cdot t_h \cdot t_a)/\{1 - t_a^2 \cdot r_s \cdot r_h \cdot \exp(-i\delta)\}$$

As a result, the intensity is given by:

$$|I|^2 = (|I_0|^2 \cdot |t_h|^2 \cdot |t_a|^2)/[1 + t_a^4 \cdot |r_s \cdot r_h|^2 - 2 t_a^2 \cdot Re\{r_s \cdot r_h \cdot \exp(-i\delta)\}]$$

On the other hand, as described above, since the refractive indices of the Si substrate 12 and the SiO$_2$ film 26 are about 3.5 and 1.5, respectively, with respect to light having a wavelength of 780 nm, the following value can be obtained:

$$|r_s|^2 = 16\%$$

Therefore, a ratio of the intensity $|I|^2$ of the light 23 incident on the interface between the Si substrate 12 and the SiO$_2$ film 26 to the intensity $|I_0|^2$ of the light 23 incident on the optical semitransparent film 25 can to be actually calculated. When the light-absorbing film 32 is not used, i.e., when the transmittance T of the light-absorbing film 32 is 100%, and the reflectance R of the optical semitransparent film 25 is 50%, the intensity ratio is obtained by:

$$|I|^2/|I_0|^2 = 0.5/(1 + 0.5 \times 0.16 - 2 \times 0.283 \times \cos\delta)$$
$$= 0.5/(1.08 - 0.566 \cos\delta)$$

As a result, the intensity ratio ranges from 30.4 to 97.3% according to the value of $\cos\delta$.

When the transmittance T of the light-absorbing film 32 is 25%, and the reflectance R of the optical semitransparent film 25 is 20%, the intensity ratio is obtained by:

$$|I|^2/|I_0|^2 = 0.2/(1 + 0.25^2 \times 0.2 \times 0.16 - 2 \times 0.25 \times 0.179 \times \cos\delta)$$
$$= 0.2/(1.002 - 0.0895 \cos\delta)$$

As a result, the intensity ratio ranges from 18.3 to 21.9% according to the value of $\cos\delta$.

When the transmittance T of the light-absorbing film 32 is 11.1%, and the reflectance R of the optical semitransparent film 25 is 10%, the intensity ratio is obtained by:

$$|I|^2/|I_0|^2 = 0.1/(1 + 0.111^2 \times 0.1 \times 0.16 - 2 \times 0.111 \times 0.126 \times \cos\delta)$$
$$= 0.1/(1.0002 - 0.028 \cos\delta)$$

As a result, the intensity ratio ranges from 9.7 to 10.2% according to the value of $\cos\delta$.

In the above calculations, the difference between the refractive indices of the SiO$_2$ film 26 and the adhesive layer 27 is small, and the reflectance of the interface therebetween is small, i.e., 0.03%. For these reasons, the reflection of the interface is neglected. Furthermore, it is an assumption that a non-reflective coating is formed between a prism 15 and the optical semitransparent film 25.

As is apparent from the above results, variations in intensity ratio are smaller when the light-absorbing film 32 is used than when the light-absorbing film 32 is not used. Therefore, according to this first embodiment, multiple interference is suppressed, and fringes are reduced. In addition, the optical semitransparent film 25 and the light-absorbing film 32 can be formed on the prism 15 in mass production. An optical optimal point can coincide with a signal optimal point, thereby improving playability.

On the other hand, in this first embodiment, unlike the above prior art, an SiN film 31 and the SiO$_2$ film 26 each having a high-precision thickness need not be formed. The photodiodes 13 and 14 can be formed with a standard process. For this reason, cost can be considerably decreased, and mass production can be performed.

Although the light-absorbing film 32 is independently used in the above first embodiment, the adhesive layer 27 may contain a dye so as to add the function of a light-absorbing film to the adhesive layer 27.

The second embodiment of the present invention applied to an optomagnetic recording laser coupler will be described below with reference to FIGS. 8A and 8B.

Figure 8A:
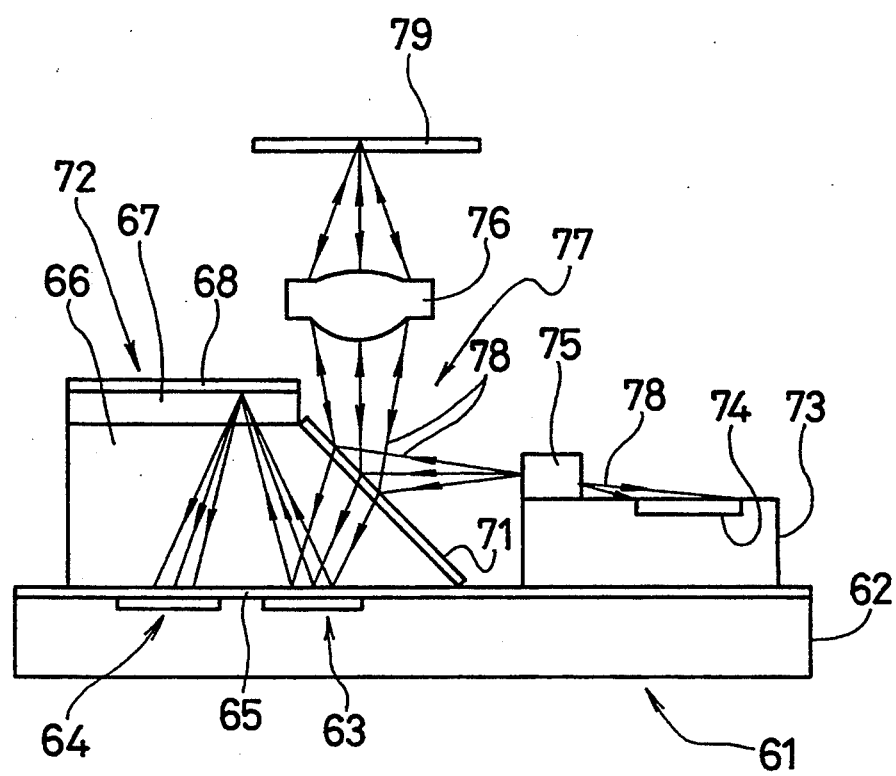
FIG. 8A is a side view showing an optomagnetic recording pickup to which the second embodiment of the present invention is applied.

As shown in FIG. 8A, in an optomagnetic recording laser coupler 61 to which the second embodiment is applied, two photodiodes 63 and 64 are formed on an Si substrate 62. As shown in FIG. 8B, the photodiode 63 is constituted by three parts A to C divided in a direction perpendicular to the alignment direction of the photodiodes 63 and 64, and the photodiode 64 is constituted by three parts D to F divided in the direction of the parts A to C.

A polarizing film 65 is formed on the entire upper surface of the Si substrate 62. This polarizing film 65 transmits only a P-polarized light component and reflects an S-polarized light component. A microprism 66 having a trapezoidal section, a height of about 1 mm, and a surface inclined at an angle of 45° is adhered on the polarizing film 65 above the photodiodes 63 and 64.

Although the polarizing film 65 is formed on the entire upper surface of the Si substrate 62, the polarizing film 65 may be formed on the entire lower surface of the microprism 66. Furthermore, the polarizing film 65 may be formed on only the upper surface portions of the Si substrate 62 which correspond to the upper portions of the photodiodes 63 and 64, or the polarizing film 65 may be formed on the lower surface portions of the microprism 66 which correspond to the photodiodes 63 and 64.

A λ/4 plate 67 is adhered on the upper surface of the microprism 66, and a total reflection film 68 is formed on the λ/4 plate 67. In addition, an unpolarizing film 71 having a reflectance of 50% is formed on the inclined surface of the microprism 66. Note that a phase film using a polymer film having uniform orientation may be used in place of the λ/4 plate 67.

As described above, an optomagnetic recording polarization optical system 72 according to the second embodiment is formed. In order to constitute the optomagnetic recording laser coupler 61, an Si substrate 73 other than the Si substrate 62 is fixed by a silver paste or the like on the polarizing film 65 at a position opposite to the inclined surface of the microprism 66.

A photodiode 74 is formed on the upper surface of the Si substrate 73, and a laser diode 75 is fixed on the upper surface of the Si substrate 73 by soldering or the like. In addition, an optomagnetic recording pickup 77 is constituted by the above optomagnetic recording laser coupler 61 and an objective lens 76.

In the optomagnetic recording pickup 77 with the above arrangement, light 78 emitted from the laser diode 75 is polarized light having an electric field component inclined at 45° with respect to the incident surface of the polarizing film 65. The light 78 is incident on the unpolarizing film 71, and only 50% of the light 78 is reflected upward. The photodiode 74 is used to directly monitor light emitted backward from the laser diode 75 and to control the amount of a current injected into the laser diode 75.

The light 78 reflected by the unpolarizing film 71 is focused by the objective lens 76 on an optomagnetic disk 79, and the polarization plane of the light is rotated in accordance with a magnetic signal recorded on the optomagnetic disk 79. The light 78 reflected by the optomagnetic disk 79 is incident on the unpolarizing film 71 again, and 50% of the reflected light 78 is transmitted through the unpolarizing film 71.

The light 78 transmitted through the unpolarizing film 71 propagates through the microprism 66 and is incident on the polarizing film 65. Only the P-polarized light component of the light 78 incident on the polarizing film 65 is transmitted through the polarizing film 65 and is incident on the photodiode 63, and the S-polarized light component of the light 78 is reflected by the polarizing film 65.

The light 78 reflected by the polarizing film 65 propagates through the microprism 66, is transmitted through the λ/4 plate 67, and is incident on the total reflection film 68. The light 78 is reflected by the total reflection film 68 and transmitted through the λ/4 plate 67 again. That is, the light 78 is reversed in the λ/4 plate 67 and is converted into a P-polarized light component.

The light 78 reflected by the total reflection film 68 propagates through the microprism 66 and is incident on the polarizing film 65. However, since the light 78 is converted into the P-polarized light component as described above, the P-polarized light component is transmitted through the polarizing film 65 and is incident on the photodiode 64. Therefore, an optomagnetic signal is obtained by differential detection expressed by:

$$RF = (A+B+C) - (D+E+F)$$

In addition, when the optomagnetic recording pickup 77 and the optomagnetic disk 79 are set in an in-focus state, as shown in FIG. 8A, the light 78 is focused on the total reflection film 68. For this reason, a focus error signal can be obtained by differential detection expressed by:

$$FE = (A+C+E) - (B+D+F)$$

Therefore, the rotation of the polarization plane of light reflected by the optomagnetic recording medium can be detected by a differential output from the first and second light-receiving elements, and an optomagnetic recording pickup can be formed. In addition, since assembling at the same level as that of a semiconductor chip can be performed, a compact, thin optomagnetic recording pickup can be formed.

Figure 10:
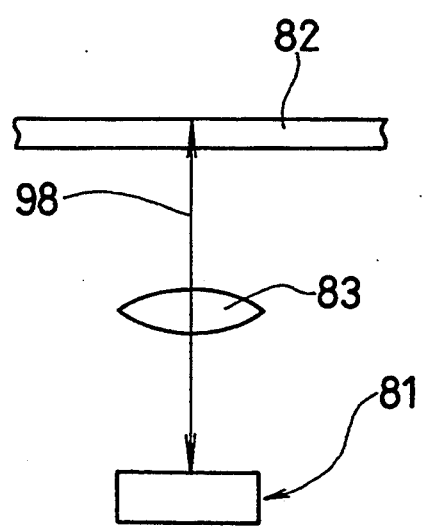
FIG. 10 is a side view showing the positional relationship between an optomagnetic disk and the optical device of the third embodiment.

The third embodiment of the present invention will be described below. As shown in FIG. 10, in a pickup for reading an optomagnetic recording signal from an optomagnetic disk 82, an optomagnetic recording laser coupler 81 is constituted by integrating optical elements.

Figure 9:
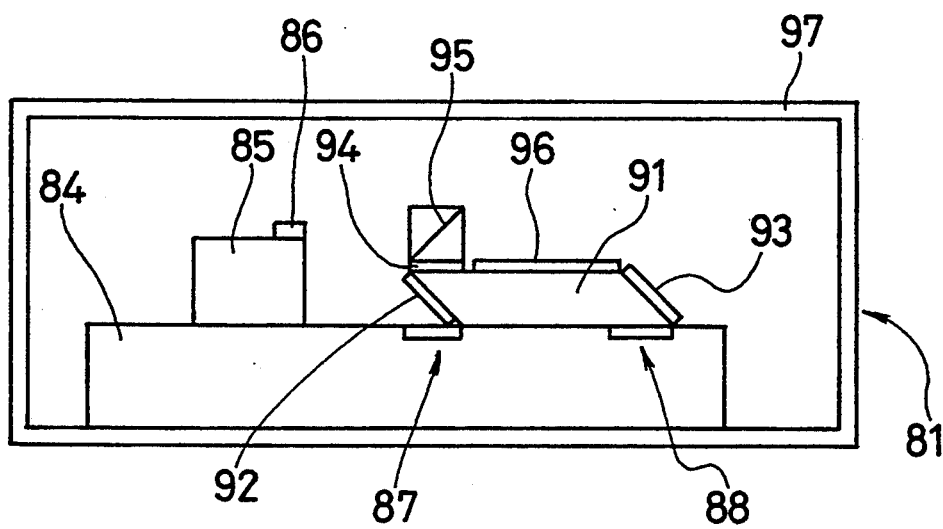
FIG. 9 is a side view showing the third embodiment of the present invention.

As shown in FIG. 9, the optomagnetic recording laser coupler 81 includes an Si substrate 84. A submount 85 serving as another Si substrate is fixed on the Si substrate 84 by a silver paste or the like, and a laser diode 86 is fixed on the submount 85 by soldering or the like.

Two photodiodes 87 and 88 are formed on the Si substrate 84 at positions different from the position where the submount 85 is fixed. As shown in FIG. 8B, the photodiode 87 is constituted by three parts A to C divided in a direction perpendicular to the alignment direction of the photodiodes 87 and 88, and the photodiode 88 is constituted by three parts D to F divided in the direction of the parts A to C.

A prism 91 having a parallelogram side section and a height of about 1 mm is adhered to the photodiodes 87 and 88. A polarization beam splitter 92 which reflects 100% of an S-polarized light component and transmits 100% of a P-polarized light component is formed on an inclined surface of the prism 91 opposite to the photodiode 87, and a total reflection mirror 93 is formed on the inclined surface opposite to the inclined surface on which the polarization beam splitter 92 is formed.

A λ/2 plate 94 and a polarization beam splitter 95 which reflects an S-polarized light component within a range of 1 to 100%, in a normal state, 20 to 80%, and transmits 100% of a P-polarized light component are integrally fixed on the upper surface of the prism 91 above the photodiode 87. Note that the reflectance for an S-polarized light component in the polarization beam splitter 95 is determined by a ratio of the intensity of the S-polarized light component returned from the optomagnetic disk 82 to the intensity of the P-polarized light component serving as a signal component, i.e., the degree of enhancement of the signal.

In addition, a stray light protecting film 96 serving as a light-absorbing film or a reflecting film is formed on the upper surface of the prism 91 at a position wherein the λ/2 plate 94 is not formed. All the above optical elements fixed on the Si substrate 84 are sealed in a package 97. A transparent window (not shown) is formed at a portion of the package 97 above the polarization beam splitter 95.

Figure 11:
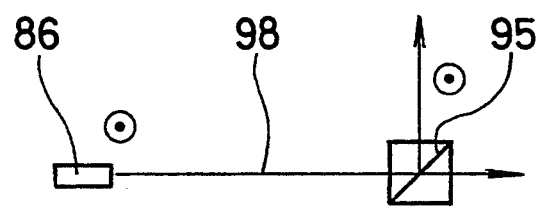
FIG. 11 is a side view for explaining the light emitted from a laser diode in the third embodiment.

In the third embodiment, as shown in FIG. 11, light 98 emitted from the laser diode 86 is an S-polarized light component having an electric field component polarized perpendicularly to the drawing surface in FIG. 11. This light 98 is incident on the polarization beam splitter 95, and only part of the light 98 is reflected upward.

The light 98 reflected by the polarization beam splitter 95, as shown in FIG. 10, is focused on the optomagnetic disk 82 by the objective lens 83, and the polarization plane of the light 98 is rotated by about ±0.3° in accordance with a magnetic signal recorded on the optomagnetic disk 82.

As a result, although 100% of the light 98 incident on the optomagnetic disk 82 is an S-polarized light component, 0.5% of the light 98 reflected by the optomagnetic disk 82, i.e., 0.5% of the light 98 returned from the optomagnetic disk 82, is a P-polarized light component as a signal component. The P-polarized light component has an electric field component polarized parallel to the drawing surface in FIG. 10.

The light 98 returning from the optomagnetic disk 82 is incident on the polarization beam splitter 95 again, 100% of the P-polarized light component serving as the signal component of the light 98 is transmitted through the polarization beam splitter 95, and only part of the S-polarized light component of the light 98 is transmitted through the polarization beam splitter 95.

Figure 12:
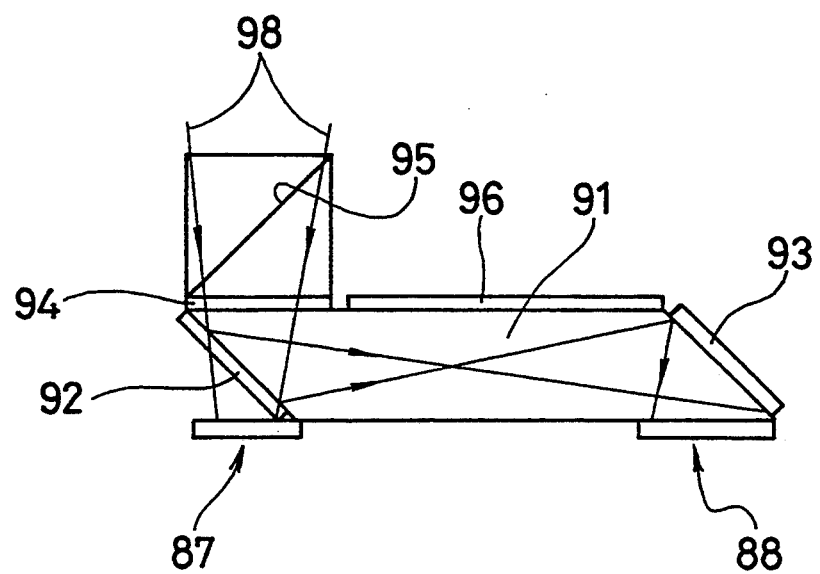
FIG. 12 is a side view showing a part of the third embodiment of the present invention.

The light 98 transmitted through the polarization beam splitter 95 is incident on the λ/2 plate 94, and the polarization direction of the light 98 is rotated through 45° by the λ/2 plate 94. As shown in FIG. 12, of the light 98 which has the polarization direction rotated through 45° by the λ/2 plate 94, is incident on the prism 91, and reaches the polarization beam splitter 92, the P-polarized light component is transmitted through the polarization beam splitter 92, and the S-polarized light component is reflected by the polarization beam splitter 92.

The light 98 transmitted through the polarization beam splitter 92 is incident on the photodiode 87. The light 98 reflected by the polarization beam splitter 92 is focused in the prism 91 once, is reflected by the total reflection mirror 93, and is incident on the photodiode 88. That is, components of the light 98 which are not modulated by the optomagnetic disk 82 are split to the photodiodes 87 and 88 at a ratio of 1:1.

Figure 8B:
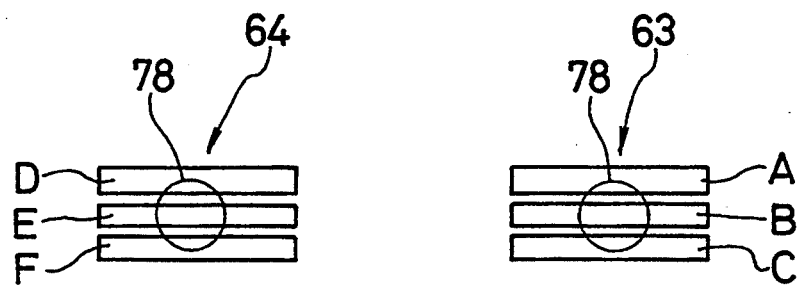
FIG. 8B is a plan view showing a photodiode in the second embodiment.

For this reason, as in the second embodiment in FIG. 8B, a focus error signal is obtained by differential detection expressed by:

$$FE = (A + C + E) - (B + D + F)$$

In addition, an optomagnetic signal can be obtained by differential detection expressed by:

$$RF = (A + B + C) - (D + E + F)$$

Figure 13:
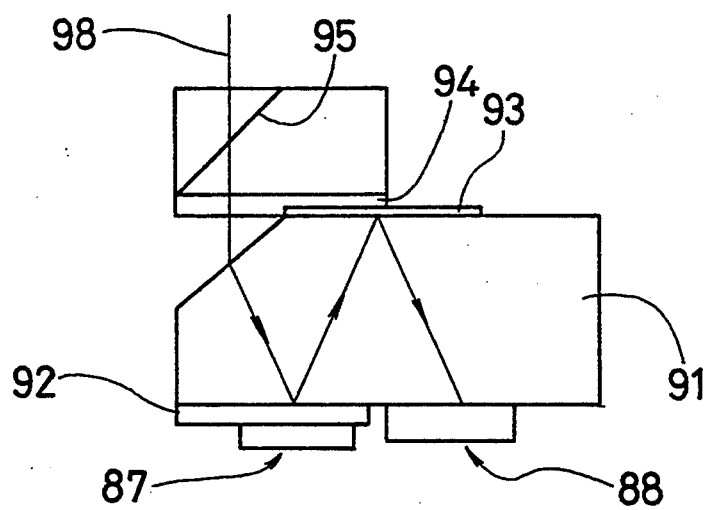
FIG. 13 is a side view showing a part of a modification of the third embodiment.
Figure 14:
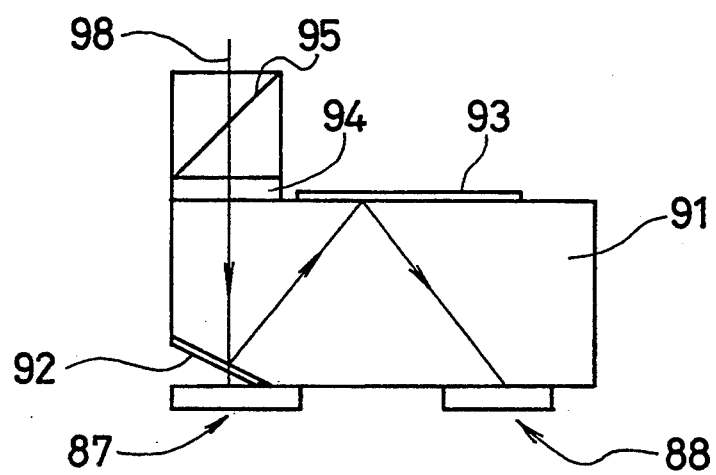
FIG. 14 is a side view showing a part of another modification of the third embodiment.

FIGS. 13 and 14 show two modifications of the third embodiment. In each of these modifications, the polarization beam splitter 92 which reflects 100% of an S-polarized light component and transmits 100% of a P-polarized light component is arranged, and the light 98 returned from the optomagnetic disk 82 are split into light components before and after the focal point of the light 98. Therefore, a focus error signal can be differentially detected, and the same function as that of the third embodiment can be obtained.

Figure 15:
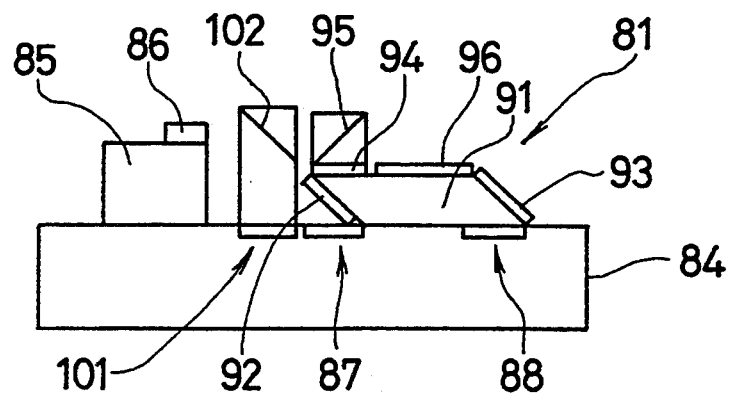
FIG. 15 is a side view showing a part of the fourth embodiment of the present invention.

FIG. 15 shows the fourth embodiment. According to the fourth embodiment, a photodiode 101 for directly monitoring an emission output from a laser diode 86 to control the amount of a current injected in the laser diode 86 is formed on an Si substrate 84, and a half mirror 102 for guiding light 98 to the photodiode 101 is arranged. The fourth embodiment has the almost same arrangement as that of the third embodiment shown in FIG. 9 except for the above-described arrangement. Note that the photodiode 101 may be adhered to a polarization beam splitter 95 or a prism 91. In this case, the half mirror 102 is not required.

As has been described above, according to the present invention, in a pickup used in an unpolarization or polarization optical system recording scheme, a laser coupler in which the amounts of light incident on two or more photodiodes are properly controlled to preferably perform differential detection can be obtained.

What is claimed is:

1. An optical apparatus comprising a structure in which a plurality of light-receiving elements are mounted on a substrate, a prism mounted on said plurality of light-receiving elements, and an optical semitransparent film mounted between said light-receiving elements and said prism, and
    a light-absorbing film mounted between said light-receiving element and said optical semitransparent film.

2. An optical apparatus comprising a structure in which a plurality of light-receiving elements are mounted on a substrate, a prism mounted on said plurality of light-receiving elements with an adhesive layer, an optical semitransparent film and
    a light-absorbing film mounted between said light-receiving element and said optical semitransparent film.

3. An optical apparatus comprising a structure in which a plurality of light-receiving elements are mounted on a substrate, a prism mounted on said plurality of light-receiving elements with an adhesive layer, an optical semitransparent film mounted between at least one of said light-receiving elements and said prism, and
    said adhesive layer which is interposed between said light-receiving elements and said optical semitransparent film is light absorbent.

4. An apparatus according to claim 3,
    wherein said adhesive layer which is interposed between said light-receiving elements and said optical semitransparent film contains a dye capable of absorbing light.

* * * * *